(12) United States Patent
Mankame et al.

(10) Patent No.: US 12,437,553 B2
(45) Date of Patent: Oct. 7, 2025

(54) REMOVING FIXED OBJECTS FROM REAR VIEW CAMERA

(71) Applicant: GM Global Technology Operations LLC, Detroit, MI (US)

(72) Inventors: Nilesh D. Mankame, Ann Arbor, MI (US); Dorel M. Sala, Troy, MI (US); Paul E. Krajewski, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 451 days.

(21) Appl. No.: 18/151,798

(22) Filed: Jan. 9, 2023

(65) Prior Publication Data
US 2024/0233395 A1 Jul. 11, 2024

(51) Int. Cl.
G06V 20/58 (2022.01)
B60R 1/26 (2022.01)
G06V 10/26 (2022.01)
G06V 10/75 (2022.01)

(52) U.S. Cl.
CPC ............... *G06V 20/58* (2022.01); *B60R 1/26* (2022.01); *G06V 10/26* (2022.01); *G06V 10/75* (2022.01); *B60R 2300/307* (2013.01)

(58) Field of Classification Search
CPC ........ G06V 20/58; G06V 10/26; G06V 10/75; B60R 1/26; B60R 2300/307
See application file for complete search history.

(56) References Cited

U.S. PATENT DOCUMENTS

| | | | | |
|---|---|---|---|---|
| 10,024,970 | B2 * | 7/2018 | Hoffman, Jr | B60R 13/04 |
| 10,607,092 | B2 * | 3/2020 | Murad | G06V 20/58 |
| 10,613,219 | B1 * | 4/2020 | DeCia | E05F 15/73 |
| 11,697,372 | B1 * | 7/2023 | Hubbell | H04N 7/181 |
| | | | | 701/1 |
| 11,884,215 | B2 * | 1/2024 | Castro | B60R 1/26 |
| 12,194,923 | B2 * | 1/2025 | Zhang | G06T 7/73 |
| 12,316,927 | B2 * | 5/2025 | McGuire | H04N 23/51 |
| 2008/0231701 | A1 * | 9/2008 | Greenwood | G08G 1/167 |
| | | | | 348/148 |
| 2017/0361836 | A1 * | 12/2017 | Lavoie | B60D 1/60 |
| 2018/0124350 | A1 * | 5/2018 | Greenwood | B60R 1/26 |
| 2018/0361998 | A1 * | 12/2018 | Renaud | H04N 23/811 |
| 2020/0086791 | A1 * | 3/2020 | Hardy | G06T 3/4038 |
| 2020/0110172 | A1 * | 4/2020 | DeCia | B62D 15/0285 |
| 2021/0053568 | A1 * | 2/2021 | Niewiadomski | B60D 1/36 |

(Continued)

*Primary Examiner* — Shaghayegh Azima
(74) *Attorney, Agent, or Firm* — Vivacqua Crane, PLLC

(57) ABSTRACT

A system for de-emphasizing fixed vehicle-mounted objects within a rear camera display includes a rear camera system adapted to capture images as the vehicle moves in reverse and display the captured images on the rear camera display, and a data processor in communication with the rear camera system and the rear camera display and adapted to collect sequential images captured by the rear camera system, compare the plurality of sequential images, identify fixed vehicle-mounted objects within the sequential images, calculate a portion of the sequential images that are obscured by identified fixed-vehicle objects, and, when the portion of the sequential images that are obscured by identified fixed-vehicle objects lies within a pre-determined range, to outline the identified fixed vehicle-mounted objects within the rear camera display, and augment the identified fixed vehicle-mounted objects.

20 Claims, 5 Drawing Sheets

(56) References Cited

U.S. PATENT DOCUMENTS

| | | | | |
|---|---|---|---|---|
| 2021/0214007 A1* | 7/2021 | Loos | ................. | G06V 20/56 |
| 2022/0134951 A1* | 5/2022 | Zhang | ................. | B60R 1/26 |
| | | | | 348/148 |
| 2022/0219604 A1* | 7/2022 | Ma | ................. | B60K 35/10 |
| 2023/0322167 A1* | 10/2023 | Brasier | ................. | E05F 15/73 |
| | | | | 348/148 |
| 2024/0116437 A1* | 4/2024 | Khan | ................. | G06T 3/40 |
| 2024/0190342 A1* | 6/2024 | Assa | ................. | B60R 1/26 |
| 2025/0171768 A1* | 5/2025 | Bashkin | ................. | C12N 15/1065 |

* cited by examiner

# REMOVING FIXED OBJECTS FROM REAR VIEW CAMERA

INTRODUCTION

The present disclosure relates to a system for identifying and de-emphasizing of identified fixed vehicle-mounted objects within a rear camera display of a vehicle. Often, objects that are mounted onto a vehicle, such as a bike rack, are captured within the field of view of a rear camera display. Such fixed vehicle-mounted objects obscure an occupant's view when the vehicle moves in reverse. Further, such fixed vehicle-mounted objects may interfere with an occupant's ability to see and recognize objects that are not mounted onto the vehicle and are positioned within the path of the vehicle as the vehicle moves in reverse.

Thus, while current systems and methods achieve their intended purpose, there is a need for a new and improved system and method for identifying and de-emphasizing of fixed vehicle-mounted objects and identifying and emphasizing objects that are not mounted onto the vehicle that are positioned in the path of the vehicle as the vehicle moves in reverse.

SUMMARY

According to several aspects of the present disclosure, a method of de-emphasizing fixed vehicle-mounted objects within a rear camera display includes collecting, with a data processor mounted within a vehicle and in communication with a rear camera system of the vehicle, a plurality of sequential images captured by the rear camera system as the vehicle moves in reverse, comparing, with the data processor, the plurality of sequential images captured by the rear camera system, identifying, with the data processor, fixed vehicle-mounted objects within the sequential images, calculating, with the data processor, a portion of the sequential images that are obscured by identified fixed-vehicle objects, and when the portion of the sequential images that are obscured by identified fixed-vehicle objects lies within a pre-determined range, outlining, with the data processor, identified fixed vehicle-mounted objects within the rear camera display, and de-emphasizing, with the data processor, the identified fixed vehicle-mounted objects within the rear camera display.

According to another aspect, the identifying, with the data processor, the fixed vehicle-mounted objects within the sequential images further includes identifying pixels within the sequential images that do not change as the vehicle moves in reverse.

According to another aspect, the method further includes prior to the identifying, with the data processor, the fixed vehicle-mounted objects within the sequential images, collecting, with at least one non-visual sensor mounted within the vehicle and in communication with the data processor, data related to the fixed vehicle-mounted objects, and analyzing, with the data processor, data related to the fixed vehicle-mounted objects collected by the at least one non-visual sensor.

According to another aspect, the collecting, with the data processor mounted within the vehicle and in communication with the rear camera system of the vehicle, the plurality of sequential images captured by the rear camera system as the vehicle moves in reverse further includes, collecting, with the data processor mounted within the vehicle and in communication with the rear camera system of the vehicle, the plurality of sequential images captured by a single camera of the rear camera system as the vehicle moves in reverse.

According to another aspect, the collecting, with the data processor mounted within the vehicle and in communication with the rear camera system of the vehicle, the plurality of sequential images captured by the rear camera system as the vehicle moves in reverse further includes, collecting, with the data processor mounted within the vehicle and in communication with the rear camera system of the vehicle, the plurality of sequential images captured by a plurality of cameras of the rear camera system as the vehicle moves in reverse.

According to another aspect, the method further includes, when the portion of the sequential images that are obscured by the identified fixed-vehicle objects lies within a pre-determined range, identifying, with the data processor, objects that are not mounted on the vehicle and are positioned behind the vehicle that are at least partially obscured by the identified fixed vehicle-mounted objects within the rear camera display, and emphasizing, with the data processor, the identified objects that are not mounted on the vehicle.

According to another aspect, the identifying, with the data processor, the objects that are not mounted on the vehicle and are positioned behind the vehicle that are at least partially obscured by the identified fixed vehicle-mounted objects within the rear camera display further includes identifying, with the data processor, the objects that are not mounted on the vehicle and are positioned behind the vehicle within the plurality of sequential images collected by the rear camera system, collecting, with at least one non-visual sensor mounted within the vehicle and in communication with the data processor, data related to the objects that are not mounted on the vehicle and are positioned behind the vehicle, and analyzing, with the data processor, data related to the objects that are not mounted on the vehicle and are positioned behind the vehicle collected by the at least one non-visual sensor.

According to another aspect, the de-emphasizing, with the data processor, the identified fixed vehicle-mounted objects within the rear camera display further includes altering, with the data processor, an extent of de-emphasizing of the outlined fixed vehicle-mounted objects within the rear camera display.

According to another aspect, the de-emphasizing, with the data processor, the identified fixed vehicle-mounted objects within the rear camera display further includes replacing, with the data processor, the outlined fixed vehicle-mounted objects within the rear camera display with imagery that mimics background imagery adjacent the outlined fixed vehicle-mounted objects within the rear camera display.

According to several aspects of the present disclosure, a system for de-emphasizing fixed vehicle-mounted objects within a rear camera display of a vehicle includes a rear camera system adapted to capture images as the vehicle moves in reverse and to display the captured images on the rear camera display, and a data processor in communication with the rear camera system and the rear camera display and adapted to collect a plurality of sequential images captured by the rear camera system as the vehicle moves in reverse, compare the plurality of sequential images captured by the rear camera system, identify the fixed vehicle-mounted objects within the sequential images, calculate a portion of the sequential images that are obscured by the identified fixed vehicle-mounted objects, and when the portion of the sequential images that are obscured by the identified fixed vehicle-mounted objects lies within a pre-determined range, the data processor is further adapted to outline the identified fixed vehicle-mounted objects within the rear camera display, and de-emphasize the identified fixed vehicle-mounted objects within the rear camera display.

According to another aspect, when identifying the fixed vehicle-mounted objects within the sequential images, the data processor is further adapted to identify pixels within the sequential images that do not change as the vehicle moves in reverse.

According to another aspect, the system further includes at least one non-visual sensor mounted within the vehicle and in communication with the data processor, wherein when identifying the fixed vehicle-mounted objects within the sequential images, the data processor is further adapted to collect data related to the fixed vehicle-mounted objects, and analyze the data related to the fixed vehicle-mounted objects collected by the at least one non-visual sensor.

According to another aspect, the rear camera system includes a single camera.

According to another aspect, the rear camera system includes a plurality of cameras.

According to another aspect, when the portion of the sequential images that are obscured by the identified fixed vehicle-mounted objects lies within a pre-determined range, the data processor is further adapted to identify objects that are not mounted on the vehicle and are positioned behind the vehicle that are at least partially obscured by the identified fixed vehicle-mounted objects within the rear camera display, and emphasize the identified objects that are not mounted on the vehicle.

According to another aspect, the system includes at least one non-visual sensor mounted within the vehicle and in communication with the data processor and adapted to collect data related to the objects that are not mounted on the vehicle and are positioned behind the vehicle, wherein the data processor is further adapted to identify the objects that are not mounted on the vehicle and are positioned behind the vehicle within the plurality of sequential images collected by the rear camera system, and analyze data related to the objects that are not mounted on the vehicle and are positioned behind the vehicle collected by the at least one non-visual sensor.

According to another aspect, when de-emphasizing the identified fixed vehicle-mounted objects within the rear camera display, the data processor is further adapted to select an approach to and extent of de-emphasis of the outlined fixed vehicle-mounted objects within the rear camera display.

According to another aspect, when de-emphasizing the identified fixed vehicle-mounted objects within the rear camera display, the data processor is further adapted to replace the outlined fixed vehicle-mounted objects within the rear camera display with imagery that mimics background imagery adjacent the outlined fixed vehicle-mounted objects within the rear camera display.

According to another aspect, the data processor is adapted to one of de-emphasize the identified fixed vehicle-mounted objects within the rear camera display based on pre-selected preferences, and de-emphasize the identified fixed vehicle-mounted objects within the rear camera display based on real-time preferences provided by an occupant within the vehicle.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

Figure 1:
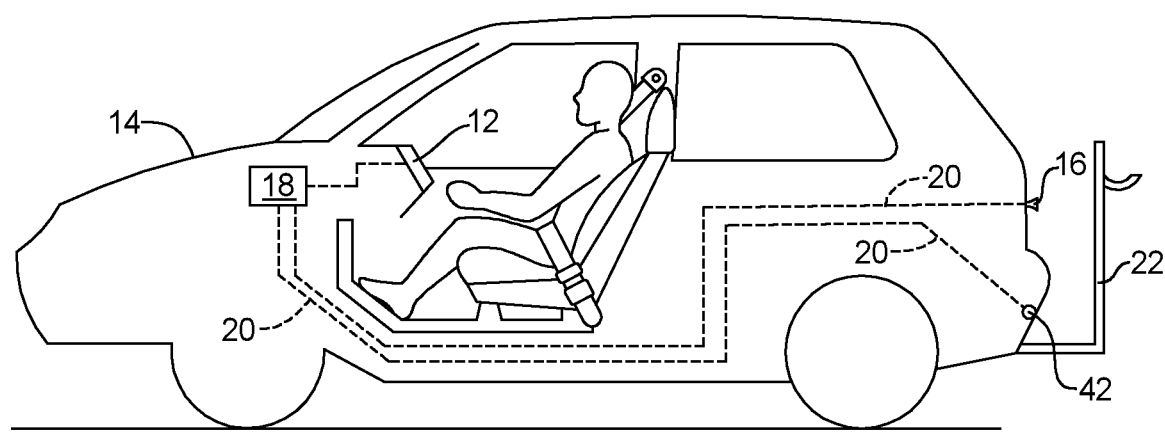
FIG. 1 is a schematic view of a vehicle having a system according to an exemplary embodiment of the present disclosure.

The figures are not necessarily to scale and some features may be exaggerated or minimized, such as to show details of particular components. In some instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art to variously employ the present disclosure.

DETAILED DESCRIPTION

The following description is merely exemplary in nature and is not intended to limit the present disclosure, application, or uses. Furthermore, there is no intention to be bound by any expressed or implied theory presented in the preceding technical field, background, brief summary or the following detailed description. It should be understood that throughout the drawings, corresponding reference numerals indicate like or corresponding parts and features. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality. Although the figures shown herein depict an example with certain arrangements of elements, additional intervening elements, devices, features, or components may be present in actual embodiments. It should also be understood that the figures are merely illustrative and may not be drawn to scale.

As used herein, the term "vehicle" is not limited to automobiles. While the present technology is described primarily herein in connection with automobiles, the technology is not limited to automobiles. The concepts can be used in a wide variety of applications, such as in connection with aircraft, marine craft, other vehicles, and consumer electronic components.

Referring to FIG. 1, a system 10 for de-emphasizing fixed vehicle-mounted objects within a rear camera display 12 of a vehicle 14 includes a rear camera system 16 adapted to capture images as the vehicle 14 moves in reverse and to display the captured images on the rear camera display 12. The system further includes a data processor 18 in communication with the rear camera system 16 and the rear camera display 12.

The data processor 18 is a non-generalized, electronic control device having a preprogrammed digital computer or processor, memory or non-transitory computer readable medium used to store data such as control logic, software applications, instructions, computer code, data, lookup tables, etc., and a transceiver [or input/output ports]. computer readable medium includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device. Computer code includes any type of program code, including source code, object code, and executable code.

The data processor 18 communicates with the rear camera system 16 and the rear camera display 12 via a vehicle communication network or communications bus 20 (e.g., a wired vehicle communications bus, a wireless vehicle communications network, or some other suitable communications network). The communications bus 34 provides network connections using one or more network protocols and can use a serial data communication architecture. Examples of suitable network connections include a controller area network (CAN), a media oriented system transfer (MOST), a local interconnection network (LIN), a local area network (LAN), and other appropriate connections such as Ethernet or others that conform with known ISO, SAE, and IEEE standards and specifications.

The data processor 18 is adapted to collect a plurality of sequential images captured by the rear camera system 16 as the vehicle 14 moves in reverse. A rear camera system 16 includes a reversing video camera or a CCTV (closed circuit TV) camera that is mounted on the rear of the vehicle, and the rear camera display 12 includes a viewing screen mounted on the dash of the vehicle 14. This allows an occupant within the vehicle 14 to clearly see what is behind the vehicle 14 without having to turn around to look. Video cameras see and interpret objects behind the vehicle 14 just like human drivers do with their eyes. Typically, video cameras are positioned around the automobile at every angle to maintain a 360 degree view around the automobile and providing a broader picture of the traffic conditions around them. Video cameras display highly detailed and realistic images, and automatically detect objects, such as other cars, pedestrians, cyclists, traffic signs and signals, road markings, bridges, and guardrails, classify them, and determine the distances between them and the vehicle 14. A video camera of the rear camera system 16 is positioned to capture images behind the vehicle 14.

In an exemplary embodiment, the rear camera system 16 includes a single camera directed rearward from a rear of the vehicle 14. In another exemplary embodiment, the rear camera system 16 includes multiple cameras directed rearward from various locations at the rear of the vehicle 14.

The data processor 18 is further adapted to compare the plurality of sequential images captured by the rear camera system 16 and to identify fixed vehicle-mounted objects 22 within the sequential images. Various techniques exist that allow an algorithm to identify stationary and moving objects within a sequence of video images. Rear camera systems 16 within a vehicle 14 have the added complexity in that the camera itself is moving, as the vehicle 14 to which the rear camera system 16 is mounted moves. In an exemplary embodiment, the data processor 18 identifies fixed vehicle-mounted objects 22 by identifying pixels within the sequential images that do not change as the vehicle 14 moves in reverse. Since the vehicle 14 is moving, any pixel that does not change from one sequential image to another is an indication that the subject of that pixel is moving in perfect synchronization with the vehicle 14, and thus, is likely mounted onto the vehicle.

Figure 2:
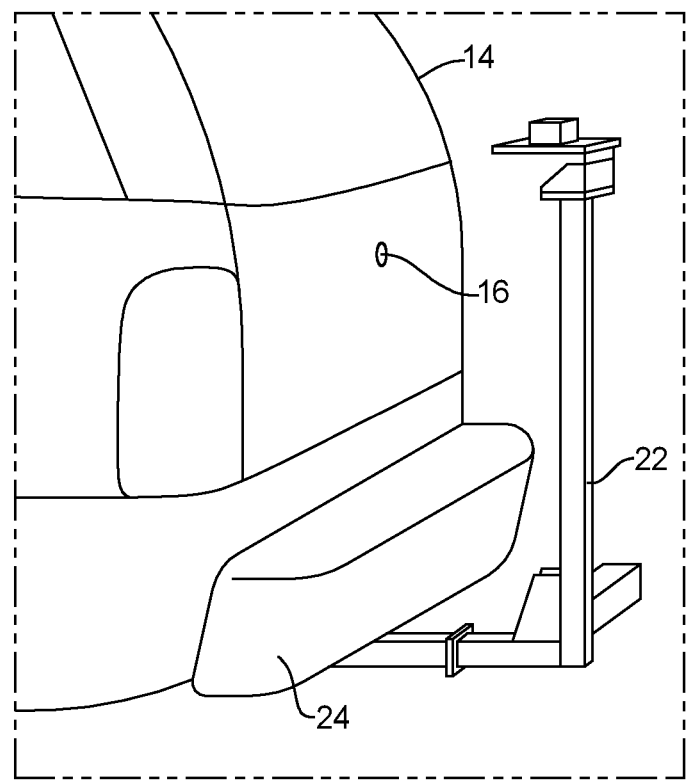
FIG. 2 is a perspective view of a rear of a vehicle having a bike rack mounted thereon.
Figure 3:
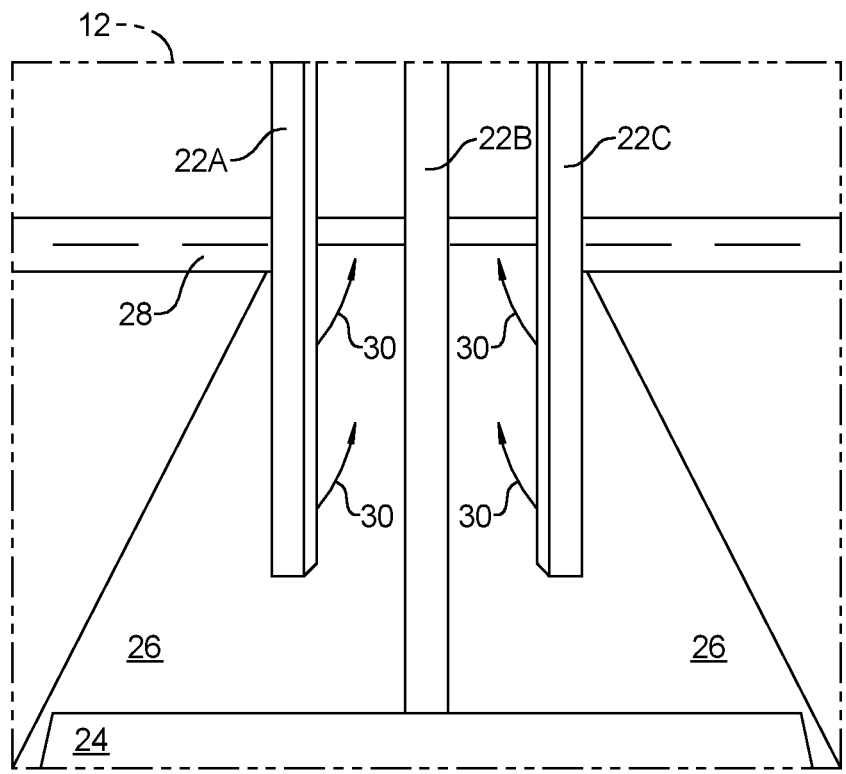
FIG. 3 is a rear camera display including an image that includes fixed vehicle-mounted objects according to an exemplary embodiment.

Referring to FIG. 1 and FIG. 2, an example of a fixed vehicle-mounted object 22 is a bike rack. The bike rack is mounted onto a rear receiver of the vehicle 14, and extends upward and into the field of view of the rear camera system 16. Referring to FIG. 3, the rear camera display 12 provides a view of the area behind the vehicle 14, including the rear bumper 24 of the vehicle 14, a concrete driveway 26 and an adjoining roadway 28. The fixed vehicle-mounted object 22 (as shown, a bike rack) extends upward and appears in the image captured by the rear camera system 16. Fixed vehicle-mounted objects 22 may be any item that is mounted onto a vehicle 14 and extends within the field of view of a rear camera system 16, such as a hitch, bike rack or hitch receiver cargo carrier as well as an item attached to a bumper, trunk lid or rear windshield.

The data processor 18 is further adapted to calculate a portion of the sequential images that are obscured by identified fixed-vehicle objects 22. Referring again to FIG. 3, the data processor will calculate how much of the total area of the rear camera display 12 is occupied by any fixed vehicle-mounted objects 22, and determine if that portion exceeds a pre-determined threshold. For example, it may be determined that if more than 10% of the total area of the rear camera display 12 is obscured by fixed vehicle-mounted objects 22, there is sufficient risk that a driver's view may be blocked to a point where the driver cannot adequately see the area behind the vehicle 14, and de-emphasizing of the fixed vehicle-mounted objects 22 is necessary. On the other hand, if a significant portion of the view is obscured such that the unobstructed view does not provide sufficient information for safe reversal of the vehicle, any de-emphasizing that is provided may also not be sufficient and the approach disclosed here cannot be used. The pre-determined thresholds may be set values, or alternatively, may be set by an occupant of the vehicle to personal preferences within a pre-determined range.

If the portion of the sequential images that are obscured by the identified fixed-vehicle objects 22 is less than 10% of the total area of the rear camera display 12, the system will do nothing. If the portion of the sequential images that are obscured by the identified fixed-vehicle objects 22 is greater than 80% of the total area of the rear camera display 12, the system will warn the driver that de-emphasizing is unadvisable. If, however, the portion of the sequential images that are obscured by the identified fixed-vehicle objects 22 lies between the upper and lower pre-determined thresholds, the data processor 18 is further adapted to outline the identified fixed vehicle-mounted objects 22 within the rear camera display 12, and to de-emphasize the identified fixed vehicle-mounted objects 22 within the rear camera display 12.

Figure 4:
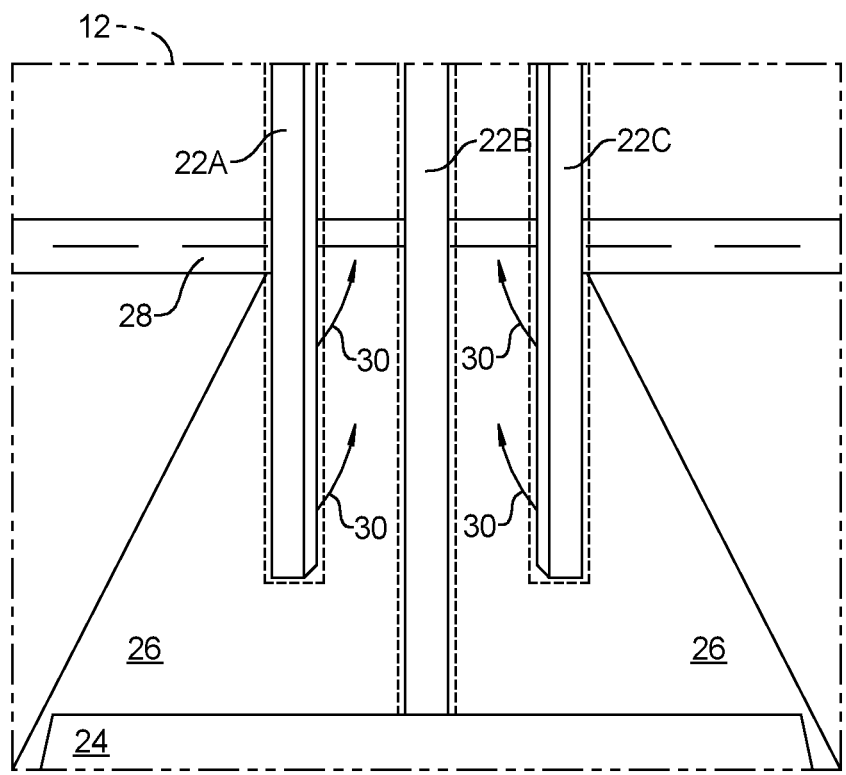
FIG. 4 is a is a rear camera display including an image that includes fixed vehicle-mounted objects that are outlined by a data processor according to an exemplary embodiment.

Referring to FIG. 4, arms 22A, 22B, 22C of the bike rack (fixed vehicle-mounted object 22) are outlined with heavy dashed lines. As shown, the arms 22A, 22B, 22C include straps 30, extending outward that would be used to secure a bicycle to the bike rack. The straps 30 are not outlined, as, when the vehicle 14 moves, the straps 30 will sway and move relative to the vehicle 14, and thus, will not be identified as fixed vehicle-mounted objects 22. Outlining the parts of the display that are identified as corresponding to vehicle-fixed objects is the first step in a multi-step procedure disclosed in FIG. 8.

Figure 5:
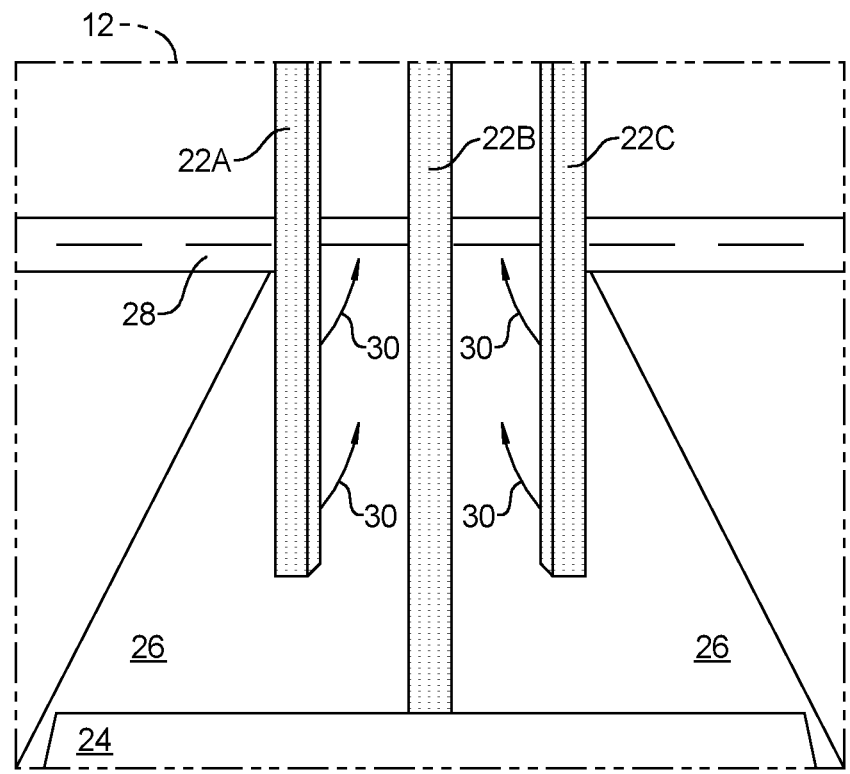
FIG. 5 is a rear camera display including an image that includes fixed vehicle-mounted objects that have been de-emphasized (e.g. blurred) according to an exemplary embodiment.

Referring to FIG. 5, in an exemplary embodiment, after the fixed vehicle-mounted objects 22 within the rear camera display 12 are identified, the data processor 18 is further adapted to de-emphasize the outlined fixed vehicle-mounted objects 22 within the rear camera display 12 e.g. by blurring them. Several different levels of de-emphasis might be offered and the occupant can choose the level per their preference. As shown, the arms 30 of the bike rack, that are outlined in FIG. 4, are blurred in FIG. 5. Blurring of the identified fixed vehicle-mounted objects 22 makes the fixed vehicle-mounted objects 22 less noticeable to an occupant of the vehicle 14, and allows the attention of the occupant within the vehicle 14 to be focused on other objects that may lie in the path of the vehicle but are partially obscured by the vehicle-mounted objects in the rear camera display 12.

Figure 6:
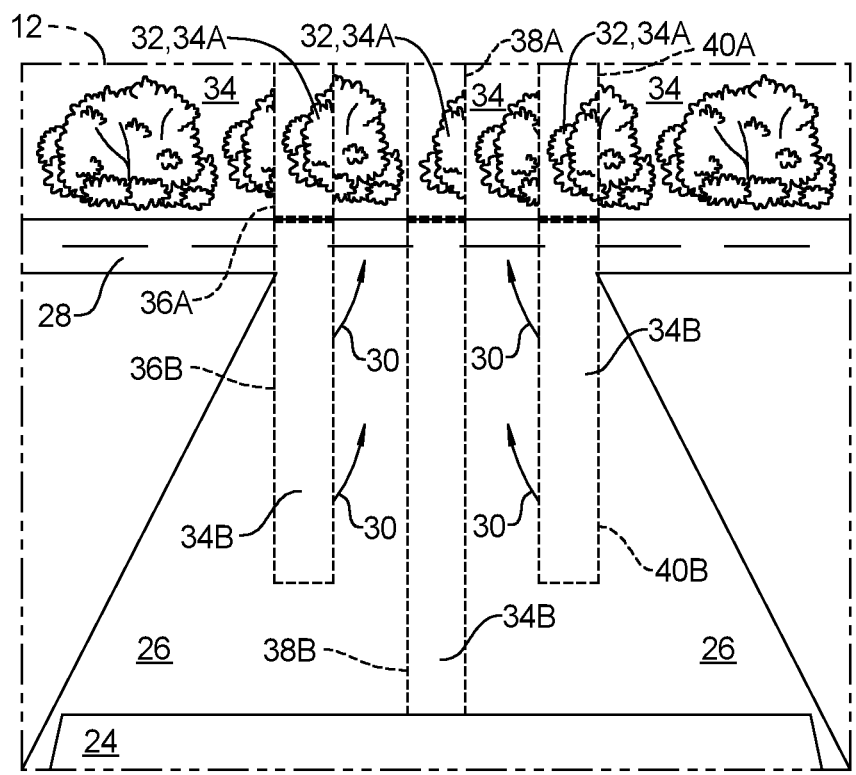
FIG. 6 is a rear camera display including an image that includes fixed vehicle-mounted objects that have been replaced with imagery that mimics background imagery adjacent the fixed vehicle-mounted objects according to an exemplary embodiment.

Referring to FIG. 6, in another exemplary embodiment, when de-emphasizing the identified fixed vehicle-mounted objects 22 within the rear camera display 12, the data processor 18 is further adapted to replace the outlined fixed vehicle-mounted objects 22 within the rear camera display 12 with imagery 32 that mimics background imagery 34 adjacent the outlined fixed vehicle-mounted objects 22 within the rear camera display 12. This is one of the levels of de-emphasis described above. As shown in FIG. 4, the data processor 18 outlines the arms 22A of the bike rack (fixed vehicle-mounted object 22). Referring to FIG. 6, the data processor 18 further analyzes background of the image within the rear camera display 12, and identifies six regions within the outlined fixed vehicle-mounted objects 22. The regions are identified based on the type of background which appears in the image adjacent the outlined fixed vehicle-mounted objects 22, here the arms 22A of the bike rack.

In the example shown in FIG. 6, the data processor 18 divides a first arm 22A into two regions. A first region 36A is identified based on the background imagery 34A adjacent the first region 36A on either side being bushes or shrubs. A second region 36B is identified based on the background imagery 34 adjacent the second region 36B on either side being the concrete driveway 26/roadway 28. Likewise, the data processor 18 divides a second arm 22B into two regions. A first region 38A is identified based on the background imagery 34A adjacent the first region 38A on either side being bushes or shrubs. A second region 38B is identified based on the background imagery 34B adjacent the second region 38B on either side being the concrete driveway 26/roadway 28, and divides a third arm 22C into two regions. A first region 40A is identified based on the background imagery 34A adjacent the first region 40A on either side being bushes or shrubs. A second region 40B is identified based on the background imagery 34B adjacent the second region 40B on either side being the concrete driveway 26/roadway 28.

For each of the three outlined arms 22A, 22B, 22C, the data processor 18 replaces the imagery of the arms 22A, 22B, 22C, with imagery that matches the background imagery 34. Specifically, the data processor 18 replaces the imagery within the first regions 36A, 38A, 40A of the first, second and third arms 22A, 22B, 22C with imagery of bushes and/or shrubs to match the background imagery 34A adjacent the first regions 36A, 38A, 40A of the first, second and third arms 22A, 22B, 22C. Further, the data processor 18 replaces the imagery within the second regions 36B, 38B, 40B of the first, second and third arms 22A, 22B, 22C with imagery of concrete to match the background imagery 34B adjacent the second regions 36B, 38B, 40B of the first, second and third arms 22A, 22B, 22C.

In one exemplary embodiment, the rear camera system 16 includes a single camera, wherein the data processor 18, when replacing outlined fixed vehicle-mounted objects 22 within the rear camera display 12 with imagery 32 that mimics background imagery 34 adjacent the outlined fixed vehicle-mounted objects 22 within the rear camera display 12 is adapted to interpolate, or approximate the imagery that an occupant would see if the identified fixed vehicle-mounted objects 22 were not present. For example, the data processor 18 may simply cut a cluster of pixels from the image adjacent the outlined fixed vehicle-mounted objects 22 and paste the cut pixels within the image over the outlined fixed vehicle-mounted objects 22.

In another exemplary embodiment, the rear camera system 16 includes multiple cameras that allow the data processor 18 to capture images taken from different locations of the rear of the vehicle 14 and at different angles. Thus, the data processor 18, when replacing outlined fixed vehicle-mounted objects 22 within the rear camera display 12 with imagery 32 that mimics background imagery 34 adjacent the outlined fixed vehicle-mounted objects 22 within the rear camera display 12 is adapted to use clusters of pixels captured from various cameras to replace the outlined fixed vehicle-mounted objects 22 within the rear camera display 12 with actual imagery that an occupant would see if the identified fixed vehicle-mounted objects 22 were not present.

The data processor 18 is adapted to de-emphasize the identified fixed vehicle-mounted objects 22 to various levels. For example, as discussed above, with reference to FIG. 5, the data processor 18 may provide "level 1" de-emphasizing, wherein the outlined fixed vehicle-mounted objects 22 are slightly blurred, or the data processor 18 may provide "level 2" de-emphasizing, wherein the outlined fixed vehicle-mounted objects 22 are more severely blurred. In an exemplary embodiment, the data processor 18 provides multiple levels of de-emphasizing that provide increasing severity of blurring of the identified fixed vehicle-mounted objects. The highest level of de-emphasizing being when the data processor 18, rather than blurring the fixed vehicle-mounted objects 22, replaces the outlined fixed vehicle-mounted objects 22 within the rear camera display 12 with imagery 32 that mimics background imagery 34 adjacent the outlined fixed vehicle-mounted objects 22 within the rear camera display 12.

In an exemplary embodiment, the data processor 18 is adapted to provide a level of de-emphasizing (various levels of blurring or imagery replacement) based on pre-selected preferences. An occupant within the vehicle may input such preferences, which the data processor 18 will save and use whenever fixed vehicle-mounted objects 22 are identified within the images captured by the rear camera system 16 and presented to the occupant within the vehicle 14 on the rear camera display 12.

In another exemplary embodiment, the data processor 18 is adapted to provide a level of de-emphasizing (various levels of blurring or imagery replacement) based on real-time preferences provided by an occupant within the vehicle 14. Upon identification of fixed vehicle-mounted objects 22 within the images captured by the rear camera system 16, the data processor 18 is adapted to prompt the occupant within the vehicle 14 to allow the occupant within the vehicle 14 to input preferences for de-emphasizing.

Referring again to FIG. 1, in an exemplary embodiment, the system 10 further includes at least one non-visual sensor 42 mounted within the vehicle 14 and in communication with the data processor 18 via the communication bus 20. The at least one non-visual sensor 42 may be Lidar, Radar or an ultra-sonic time-of-flight distance measurement sensor. Lidar is an electronic vehicle device that includes a lidar emitter and a lidar receiver. A lidar unit can emit non-visible light waves for purposes of object detection. The lidar unit operates to obtain spatial or other physical information regarding one or more objects within the field of view of the lidar unit through emitting light waves and receiving the reflected light waves. In many embodiments, the lidar unit emits a plurality of light pulses (e.g., laser light pulses) and receives the reflected light pulses using a lidar receiver. The lidar unit may be mounted (or installed) on the rear of the vehicle 14 (e.g., a rear bumper), etc. Lidar data captured by a lidar unit can be represented in a pixel array (or other similar visual representation). A lidar unit can capture static lidar images and/or lidar image or video streams.

Radar is an electronic vehicle device that uses radio waves to obtain spatial or other physical information regarding one or more objects within the field of view of the radar. A radar unit includes a transmitter that transmits electromagnetic radio waves via use of a transmitting antenna and can include various electronic circuitry that enables the generation and modulation of an electromagnetic carrier signal. In other embodiments, the radar can transmit electromagnetic waves within another frequency domain, such as the microwave domain. The radar unit includes a signal processor, which can at least partially (e.g., fully) be implemented using a processor, or which may at least partially (e.g., fully) be implemented with dedicated circuitry. The radar can include a separate receiving antenna, or the radar can include a single antenna for both reception and transmission of radio signals. And, in other embodiments, the radar can include a plurality of transmitting antennas, a plurality of receiving antennas, or a combination thereof so as to implement multiple input multiple output (MIMO), single input multiple output (SIMO), or multiple input single output (MISO) techniques. The vehicle 14 can include a radar unit that can be mounted at the rear of the vehicle 14 and directed to capture objects located behind the vehicle 14.

In an exemplary embodiment, when identifying fixed vehicle-mounted objects 22 within the sequential images, the data processor 18 is further adapted to collect data related to fixed vehicle-mounted objects 22 that is captured by the at least one non-visual sensor 42, and to analyze the data related to fixed vehicle-mounted objects 22 collected by the at least one non-visual sensor 42. Using the at least one non-visual sensor 42 in conjunction with the rear camera system 16 provides more robust identification of both fixed vehicle-mounted objects 22 as well as objects that are not attached to the vehicle within the field of view of the rear camera display 12.

In another exemplary embodiment, when the portion of the sequential images that are obscured by the identified fixed-vehicle objects 22 exceeds the pre-determined lower threshold, the data processor 18 is further adapted to identify objects 44 that are not mounted on the vehicle 14 and are positioned behind the vehicle 14 that are at least partially obscured by the identified fixed vehicle-mounted objects 22 within the rear camera display 12, and to emphasize the identified objects 44 that are not mounted on the vehicle 14.

Figure 7:
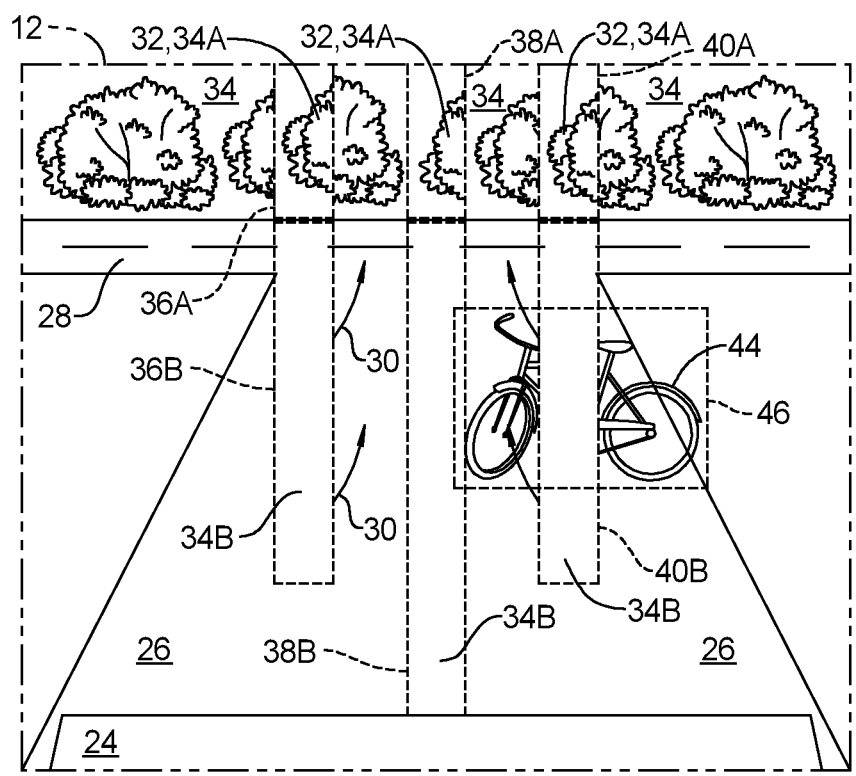
FIG. 7 is a rear camera display including an image that identifies and de-emphasizes fixed vehicle-mounted objects and identifies and emphasizes an object that is not mounted onto the vehicle but lies in the path of the vehicle according to an exemplary embodiment.

Referring to FIG. 7, the rear camera system 16 may detect objects 44 (as shown, a bicycle) that are located in the path of the vehicle 14 as the vehicle 14 moves in reverse, as such systems are designed to do. However, when fixed vehicle-mounted objects 22 are present, such as the bike rack shown in FIG. 7, the fixed vehicle-mounted objects 22 may partially or completely obscure the object 44 that is not mounted onto the vehicle 14. In such circumstances, the fixed vehicle-mounted objects 22 may prevent an occupant within the vehicle 14 from recognizing the object 44. Thus, when the data processor 18 detects objects 44 that are located in the path of the vehicle 14 as the vehicle 14 moves in reverse and are partially or completely obscured by fixed vehicle-mounted objects 22, the data processor 18 is adapted to augment such objects 44 to emphasize such objects 44 and draw the attention of an occupant within the vehicle, looking at the rear camera display 12, to such objects 44.

As shown in FIG. 7, such augmentation of objects 44 that are not vehicle-mounted may include providing an outline 46 of the object 44. As shown in FIG. 7, a square dashed line is presented surrounding the bicycle that is positioned behind the vehicle 14. It should be understood that such outline may be presented with color, may have pulsing intensity, may be filled with a translucent color or highlighting, or other visual methods that would aid in drawing an occupant's attention to the augmentation 46. Further, the approach used to emphasize the object 44 is sufficiently visually distinct from the approach used to de-emphasize vehicle-fixed objects such as 22A-C.

Further, in another exemplary embodiment, the data processor 18 is adapted to provide such augmentation only when the identified object 44 is obscured beyond a pre-determined amount. For example, the data processor 18 may be adapted to provide augmentation of identified objects 44 that are not mounted onto the vehicle 14 only when the identified fixed vehicle-mounted objects 22 obscure more than 10% of the identified objects 44 that are not mounted onto the vehicle.

In an exemplary embodiment, the characteristics of such augmentation of objects 44 that are not mounted onto the vehicle 14 and pre-determined thresholds for providing such augmentation are based on pre-selected preferences. An occupant within the vehicle 14 may input such preferences, which the data processor 18 will save and use whenever objects 44 that are not mounted onto the vehicle and fixed vehicle-mounted objects 22 are identified within the images captured by the rear camera system 16 and presented to the occupant within the vehicle 14 on the rear camera display 12.

In another exemplary embodiment, the characteristics of such augmentation of objects 44 that are not mounted onto the vehicle 14 and pre-determined thresholds for providing such augmentation are based on real-time preferences provided by an occupant within the vehicle 14. Upon identification of object 44 that are not mounted onto the vehicle 14 and fixed vehicle-mounted objects 22 within the images captured by the rear camera system 16, the data processor 18 is adapted to prompt the occupant within the vehicle 14 to allow the occupant within the vehicle 14 to input preferences for augmentation of the objects 44 that are not mounted onto the vehicle.

In an exemplary embodiment, when identifying objects 44 that are not mounted onto the vehicle within the sequential images, the data processor 18 is further adapted to collect data related to fixed objects 44 that are not mounted onto the vehicle 14 that is captured by the at least one non-visual sensor 42, and to analyze the data related to objects 44 that are not mounted onto the vehicle 14 collected by the at least one non-visual sensor 42. Using the at least one non-visual sensor 42 in conjunction with the rear camera system 16 provides more robust identification of objects 44 that are not mounted onto the vehicle 14 within the field of view of the rear camera display 12.

Figure 8:
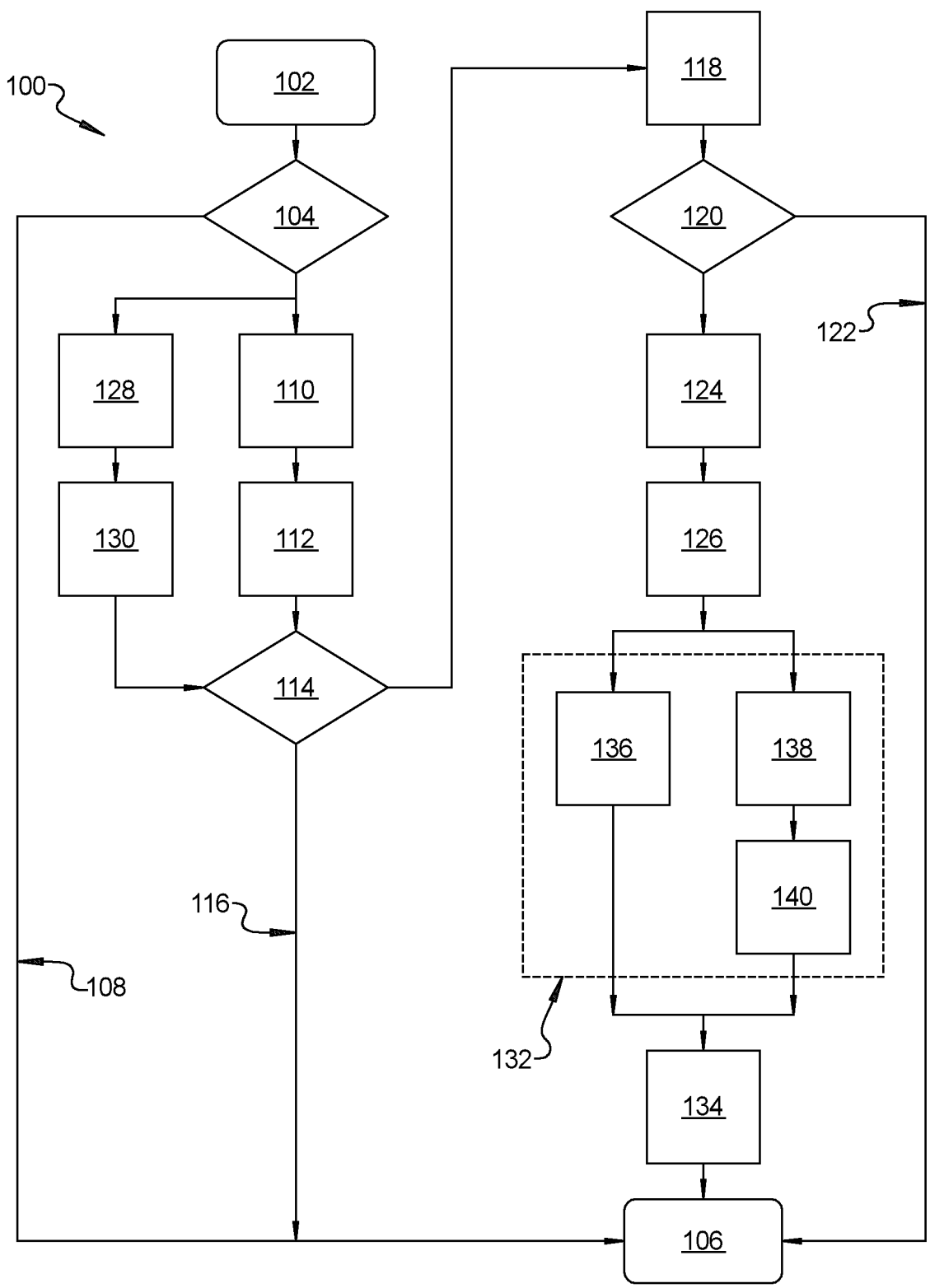
FIG. 8 is a flowchart illustrating a method according to an exemplary embodiment of the present disclosure.

Referring to FIG. 8, a method 100 of de-emphasizing fixed vehicle-mounted objects 22 within a rear camera display 12 includes, beginning a block 102 when the vehicle transmission is shifted into reverse. At block 104, the system 10 prompts the occupant of the vehicle 14 to ask if the system should be activated. If the occupant chooses to keep the system 10 de-activated, the method 100 ends at block 106, as indicated by line 108. If the occupant activates the system 10, then moving to block 110, the method 100 includes collecting, with the data processor 18 mounted within the vehicle 14 and in communication with the rear camera system 16 of the vehicle 14, a plurality of sequential images captured by the rear camera system 16 and a sequence of readings from the non-visual sensor 42, where it is available, as the vehicle 14 moves in reverse. Moving to block 112, the method 100 includes comparing, with the data processor 18, the plurality of sequential images captured by the rear camera system 16. A similar comparison of the sequential readings from the non-visual sensor 42, where it is available, is also conducted at block 12. Moreover, the data from the camera and the non-visual sensor are combined to reconstruct a robust estimate of what lies in the field of view of the camera.

Moving to block 114, the system 10 determines if there are any fixed vehicle-mounted objects 22 detected within the sequential images and/or the sequential readings from the non-visual sensor 42 and identifies, with the data processor 18, fixed vehicle-mounted objects 22 within the sequential images. If no fixed vehicle-mounted objects 22 are detected, then the method 100 ends at block 106, as indicated by line 116.

If fixed vehicle-mounted objects 22 are detected at block 114, then, moving to block 118, the method 100 includes calculating, with the data processor 18, a portion of the sequential images that are obscured by identified fixed vehicle-mounted objects 22. Moving to block 120, if the portion of the sequential images that are obscured by identified fixed vehicle-mounted objects 22 does not lie between two pre-determined thresholds, then the method 100 ends at block 106, as indicted by line 122.

If the portion of the sequential images that are obscured by identified fixed vehicle-mounted objects 22 lies between the pre-determined thresholds at block 120, then moving to block 124, the method 100 includes outlining the identified fixed vehicle-mounted objects 22 within the rear camera display 12 with the data processor 18, and, moving to block 126, de-emphasizing, with the data processor 18, the identified fixed vehicle-mounted objects 22 within the rear camera display 12.

In an exemplary embodiment, the identifying, with the data processor 18, fixed vehicle-mounted objects 22 within the sequential images at block 114 further includes identifying pixels within the sequential images that do not change as the vehicle 14 moves in reverse.

In another exemplary embodiment, the method 100 further includes, prior to the identifying, with the data processor 18, fixed vehicle-mounted objects 22 within the sequential images at block 114, moving to block 128, collecting, with at least one non-visual sensor 42 mounted within the vehicle 14 and in communication with the data processor 18, data related to fixed vehicle-mounted objects 22, and, moving to block 130, analyzing, with the data processor 18, data related to fixed vehicle-mounted objects 22 collected by the at least one non-visual sensor 42.

In another exemplary embodiment, the collecting, with a data processor 18 mounted within a vehicle 14 and in communication with a rear camera system 16 of the vehicle 14, a plurality of sequential images captured by the rear camera system 16 as the vehicle 14 moves in reverse, at block 110, further includes, collecting, with the data processor 18 mounted within the vehicle 14 and in communication with the rear camera system 16 of the vehicle 14, the plurality of sequential images captured by a single camera of the rear camera system 16 as the vehicle 14 moves in reverse.

In another exemplary embodiment, the collecting, with a data processor 18 mounted within a vehicle 14 and in communication with a rear camera system 16 of the vehicle 14, a plurality of sequential images captured by the rear camera system 16 as the vehicle 14 moves in reverse, at block 110, further includes, collecting, with the data processor 18 mounted within the vehicle 14 and in communication with the rear camera system 16 of the vehicle 14, the plurality of sequential images captured by a plurality of cameras of the rear camera system 16 as the vehicle 14 moves in reverse.

In still another exemplary embodiment, when the portion of the sequential images that are obscured by identified fixed-vehicle objects 22 lies within the pre-determined thresholds at block 120, the method 100 further includes, moving to block 124 outlines the regions in the rear view display that are identified as belonging to vehicle-fixed objects. The method 100 then moves to block 126 where the system prompts the user to select a level of de-emphasis and/or choose between different approaches to de-emphasizing such as blurring, interpolating between adjacent unobscured regions, etc. At block 132, the method 100 identifies, with the data processor 18, objects 44 that are not mounted on the vehicle 14 and are positioned behind the vehicle 14 that are at least partially obscured by the identified fixed vehicle-mounted objects 22 within the rear camera display 12. This is done using data from both: the sequence of images captured by the camera and the sequence of readings obtained from the non-visual sensor 42, where that is available. The data from both sources is combined to yield a robust reconstruction of the field of view of rear camera. The method 100 then moving to block 134, emphasizes with the data processor 18, the identified objects 44 that are not mounted on the vehicle 14.

In another exemplary embodiment, the identifying, with the data processor 18, objects 44 that are not mounted on the vehicle 14 and are positioned behind the vehicle 14 that are at least partially obscured by the identified fixed vehicle-mounted objects 22 within the rear camera display 12, at block 132, further includes, at block 136, identifying, with the data processor 18, objects 44 that are not mounted on the vehicle 14 and are positioned behind the vehicle 14 within the plurality of sequential images collected by the rear camera system 16, and, at block 138, collecting, with at least one non-visual sensor 42 mounted within the vehicle 14 and in communication with the data processor 18, data related to objects 44 that are not mounted on the vehicle 14 and are positioned behind the vehicle 14, and, moving to block 140, analyzing, with the data processor 18, data related to objects 44 that are not mounted on the vehicle 14 and are positioned behind the vehicle 14 collected by the at least one non-visual sensor 42.

In still another exemplary embodiment, the de-emphasizing, with the data processor 18, the identified fixed vehicle-mounted objects 22 within the rear camera display 12 at block 126 further includes blurring the appearance of the identified fixed vehicle-mounted objects 22 within the rear camera display 16.

In yet another exemplary embodiment, the augmenting, with the data processor 18, the identified fixed vehicle-mounted objects 22 within the rear camera display 12 at block 126 further includes replacing, with the data processor 18, the outlined fixed vehicle-mounted objects 22 within the rear camera display 12 with imagery 32 that mimics background imagery 34 adjacent the outlined fixed vehicle-mounted objects 22 within the rear camera display 12.

A system and method of the present disclosure offers several advantages. These include identification and augmentation of fixed vehicle-mounted objects 22 within the field of view of a rear camera display 12, and identification and augmentation of objects 44 that are not mounted onto the vehicle 14 and are positioned within the path of the vehicle 14 as the vehicle moves in reverse.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A method of de-emphasizing fixed vehicle-mounted objects within a rear camera display, comprising:
    collecting, with a data processor mounted within a vehicle and in communication with a rear camera system of the vehicle, a plurality of sequential images captured by the rear camera system as the vehicle moves in reverse;
    comparing, with the data processor, the plurality of sequential images captured by the rear camera system;
    identifying, with the data processor, fixed vehicle-mounted objects within each one of the plurality of sequential images;
    calculating, with the data processor, a portion of each one of the plurality of sequential images that is obscured by identified fixed-vehicle objects as a percentage of a total area captured by the rear camera system; and
    when the calculated portion of each one of the plurality of sequential images that is obscured by identified fixed-vehicle objects lies within a pre-determined range:
        outlining, with the data processor, identified fixed vehicle-mounted objects within the rear camera display;
        de-emphasizing, with the data processor, the identified fixed vehicle-mounted objects within the rear camera display;
        identifying, with the data processor, objects that are not mounted on the vehicle and are positioned behind the vehicle that are at least partially obscured by the identified fixed vehicle-mounted objects within the rear camera display; and
        emphasizing, with the data processor, the identified objects that are not mounted on the vehicle.

2. The method of claim 1, wherein the identifying, with the data processor, the fixed vehicle-mounted objects within each one of the plurality of sequential images further includes identifying pixels within each one of the plurality of sequential images that do not change as the vehicle moves in reverse.

3. The method of claim 1, further including, prior to the identifying, with the data processor, the fixed vehicle-mounted objects within each one of the plurality of sequential images:
    collecting, with at least one non-visual sensor mounted within the vehicle and in communication with the data processor, data related to the fixed vehicle-mounted objects; and
    analyzing, with the data processor, data related to the fixed vehicle-mounted objects collected by the at least one non-visual sensor.

4. The method of claim 1, wherein, the collecting, with the data processor mounted within the vehicle and in communication with the rear camera system of the vehicle, the plurality of sequential images captured by the rear camera system as the vehicle moves in reverse further includes, collecting, with the data processor mounted within the vehicle and in communication with the rear camera system of the vehicle, the plurality of sequential images captured by a single camera of the rear camera system as the vehicle moves in reverse.

5. The method of claim 1, wherein, the collecting, with the data processor mounted within the vehicle and in communication with the rear camera system of the vehicle, the plurality of sequential images captured by the rear camera system as the vehicle moves in reverse further includes, collecting, with the data processor mounted within the vehicle and in communication with the rear camera system of the vehicle, the plurality of sequential images captured by a plurality of cameras of the rear camera system as the vehicle moves in reverse.

6. The method of claim 1, wherein the identifying, with the data processor, the objects that are not mounted on the vehicle and are positioned behind the vehicle that are at least partially obscured by the identified fixed vehicle-mounted objects within the rear camera display further includes:
    identifying, with the data processor, the objects that are not mounted on the vehicle and are positioned behind the vehicle within the plurality of sequential images collected by the rear camera system;
    collecting, with at least one non-visual sensor mounted within the vehicle and in communication with the data processor, data related to the objects that are not mounted on the vehicle and are positioned behind the vehicle; and
    analyzing, with the data processor, data related to the objects that are not mounted on the vehicle and are positioned behind the vehicle collected by the at least one non-visual sensor.

7. The method of claim 1, wherein the de-emphasizing, with the data processor, the identified fixed vehicle-mounted objects within the rear camera display further includes providing, with the data processor, a level of de-emphasizing based on pre-selected preferences stored within the data processor, and altering, with the data processor, the level of de-emphasizing of the outlined fixed vehicle-mounted objects within the rear camera display based on real-time preferences provided by an occupant upon identification of fixed vehicle-mounted objects.

8. The method of claim 1, wherein the de-emphasizing, with the data processor, the identified fixed vehicle-mounted objects within the rear camera display further includes replacing, with the data processor, the outlined fixed vehicle-mounted objects within the rear camera display with imagery that mimics background imagery adjacent the outlined fixed vehicle-mounted objects within the rear camera display.

9. A system for augmenting fixed vehicle-mounted objects within a rear camera display of a vehicle, comprising:
 a rear camera system adapted to capture images as the vehicle moves in reverse and to display the captured images on the rear camera display; and
 a data processor in communication with the rear camera system and the rear camera display and adapted to:
  collect a plurality of sequential images captured by the rear camera system as the vehicle moves in reverse;
  compare the plurality of sequential images captured by the rear camera system;
  identify the fixed vehicle-mounted objects within each one of the plurality of sequential images;
  calculate a portion of each one of the plurality of sequential images that are obscured by the identified fixed vehicle-mounted objects as a percentage of a total area captured by the rear camera system; and
  when the calculated portion of each one of the plurality of sequential images that is obscured by the identified fixed vehicle-mounted objects lies within a pre-determined range, the data processor is further adapted to:
   outline the identified fixed vehicle-mounted objects within the rear camera display;
   de-emphasize the identified fixed vehicle-mounted objects within the rear camera display;
   identify objects that are not mounted on the vehicle and are positioned behind the vehicle that are at least partially obscured by the identified fixed vehicle-mounted objects within the rear camera display; and
   emphasize the identified objects that are not mounted on the vehicle.

10. The system of claim 9, wherein when identifying the fixed vehicle-mounted objects within each one of the plurality of sequential images, the data processor is further adapted to identify pixels within the sequential images that do not change as the vehicle moves in reverse.

11. The system of claim 9, further including at least one non-visual sensor mounted within the vehicle and in communication with the data processor, wherein when identifying the fixed vehicle-mounted objects within each one of the plurality of sequential images, the data processor is further adapted to:
 collect data related to the fixed vehicle-mounted objects; and
 analyze the data related to the fixed vehicle-mounted objects collected by the at least one non-visual sensor.

12. The system of claim 9, wherein the rear camera system includes a single camera.

13. The system of claim 9, wherein the rear camera system includes a plurality of cameras.

14. The system of claim 9, further including at least one non-visual sensor mounted within the vehicle and in communication with the data processor and adapted to collect data related to the objects that are not mounted on the vehicle and are positioned behind the vehicle, wherein the data processor is further adapted to:
 identify the objects that are not mounted on the vehicle and are positioned behind the vehicle within the plurality of sequential images collected by the rear camera system; and
 analyze data related to the objects that are not mounted on the vehicle and are positioned behind the vehicle collected by the at least one non-visual sensor.

15. The system of claim 9, wherein when de-emphasizing the identified fixed vehicle-mounted objects within the rear camera display, the data processor is further adapted to select an approach for de-emphasizing the outlined fixed vehicle-mounted objects to and a level of de-emphasis of the outlined fixed vehicle-mounted objects within the rear camera display.

16. The system of claim 9, wherein when de-emphasizing the identified fixed vehicle-mounted objects within the rear camera display, the data processor is further adapted to replace the outlined fixed vehicle-mounted objects within the rear camera display with imagery that mimics background imagery adjacent the outlined fixed vehicle-mounted objects within the rear camera display.

17. The system of claim 9, wherein the data processor is adapted to:
 de-emphasize the identified fixed vehicle-mounted objects within the rear camera display at a level based on pre-selected preferences; and
 alter the level at which the identified fixed vehicle-mounted objects within the rear camera display are de-emphasized based on real-time preferences provided by an occupant within the vehicle upon identification of the fixed vehicle-mounted objects.

18. A method of de-emphasizing fixed vehicle-mounted objects within a rear camera display, comprising:
 collecting, with a data processor mounted within a vehicle and in communication with a rear camera system of the vehicle, a plurality of sequential images captured by the rear camera system as the vehicle moves in reverse;
 collecting, with at least one non-visual sensor mounted within the vehicle and in communication with the data processor, data related to fixed vehicle-mounted objects;
 comparing, with the data processor, the plurality of sequential images captured by the rear camera system;
 identifying, with the data processor, fixed vehicle-mounted objects within each one of the plurality of sequential images by identifying pixels within each one of the plurality of sequential images that do not change as the vehicle moves in reverse and analyzing data related to the fixed vehicle-mounted objects collected by the at least one non-visual sensor;
 calculating, with the data processor, a portion of each one of the plurality of sequential images that are obscured by the identified fixed-vehicle objects as a percentage of a total area captured by the rear camera system; and
 when the calculated portion of each one of the plurality of sequential images that are obscured by the identified fixed-vehicle objects lies within a pre-determined range:
  outlining, with the data processor, the identified fixed vehicle-mounted objects within the rear camera display;
  de-emphasizing, with the data processor, the identified fixed vehicle-mounted objects within the rear camera display by one of:

blurring an appearance of the identified fixed vehicle-mounted objects within the rear camera display; and replacing the outlined fixed vehicle-mounted objects within the rear camera display with imagery that mimics background imagery adjacent the outlined fixed vehicle-mounted objects within the rear camera display;

identifying, with the data processor, objects that are not mounted on the vehicle and are positioned behind the vehicle that are at least partially obscured by the identified fixed vehicle-mounted objects within the rear camera display by:

identifying, with the data processor, the objects that are not mounted on the vehicle and are positioned behind the vehicle within the plurality of sequential images collected by the rear camera system;

collecting, with at least one non-visual sensor mounted within the vehicle and in communication with the data processor, data related to objects that are not mounted on the vehicle and are positioned behind the vehicle; and analyzing, with the data processor, data related to the objects that are not mounted on the vehicle and are positioned behind the vehicle collected by the at least one non-visual sensor; and emphasizing, with the data processor, the identified objects that are not mounted on the vehicle.

19. The method of claim 1, wherein the identifying, with the data processor, the fixed vehicle-mounted objects within each one of the plurality of sequential images further includes identifying objects that are mounted to the vehicle and extend within a field of view of the rear camera system.

20. The system of claim 9, wherein, when identifying the fixed vehicle-mounted objects within each one of the plurality of sequential images, the data processor is further adapted to identify objects that are mounted to the vehicle and extend within a field of view of the rear camera system.

* * * * *